(12) United States Patent
Tilton et al.

(10) Patent No.: US 6,900,145 B2
(45) Date of Patent: May 31, 2005

(54) TRIM PANEL INSULATOR FOR A VEHICLE

(75) Inventors: Jeffrey A. Tilton, Goshen, KY (US); Lee A. Staelgraeve, Lambertville, MI (US); Thomas T. Block, Howell, MI (US); Paul W. Poole, Huntersville, NC (US)

(73) Assignee: Owens Corning Fiberglas Technology, Inc., Summit, IL (US)

( * ) Notice: Subject to any disclaimer, the term of this patent is extended or adjusted under 35 U.S.C. 154(b) by 138 days.

(21) Appl. No.: 09/939,284

(22) Filed: Aug. 24, 2001

(65) Prior Publication Data

US 2003/0039793 A1 Feb. 27, 2003

(51) Int. Cl.[7] .............................. D03D 25/00; B32B 5/26
(52) U.S. Cl. ....................... 442/181; 442/381; 442/382; 442/383; 442/384; 428/170; 181/284; 181/256
(58) Field of Search .................................. 442/181, 381, 442/383; 428/170; 181/284, 256

(56) References Cited

U.S. PATENT DOCUMENTS

| 4,851,283 A | 7/1989 | Holtrop et al. |
| 6,008,149 A | 12/1999 | Copperwheat |

*Primary Examiner*—Glenn Caldarola
*Assistant Examiner*—Alexis Wachtel
(74) *Attorney, Agent, or Firm*—Inger H. Eckert; Maria C. Gasaway

(57) ABSTRACT

A trim panel insulator is provided for a vehicle. The insulator includes a nonlaminate acoustical and thermal insulating layer of polymer fiber. The insulator may include a relatively high density, nonlaminate skin of polymer fiber and/or one or more facing layers constructed from various materials.

12 Claims, 2 Drawing Sheets

TRIM PANEL INSULATOR FOR A VEHICLE

TECHNICAL FIELD AND INDUSTRIAL APPLICABILITY OF THE INVENTION

The present invention relates generally to the field of acoustical and thermal insulation and, more particularly, to a trim panel insulator for a vehicle.

BACKGROUND OF THE INVENTION

Acoustical and thermal insulators and liners for application to vehicles are well known in the art. These insulators typically rely upon both sound absorption, i.e. the ability to absorb incident sound waves and transmission loss, i.e. the ability to reflect incident sound waves, in order to provide sound attenuation. They also rely upon thermal shielding properties to prevent or reduce the transmission of heat from various heat sources (e.g. engine, transmission and exhaust system), to the passenger compartment of the vehicle. Such insulation is commonly employed as an under carpet heat shield and a floor pan insulator.

Examples of acoustical and thermal insulation in the form of liners are disclosed in a number of prior art patents including U.S. Pat. No. 4,851,283 to Holtrop et al. and U.S. Pat. No. 6,008,149 to Copperwheat. As should be apparent from a review of these two patents, engineers have generally found it necessary to construct such liners from a laminate incorporating (a) one or more layers to provide the desired acoustical and thermal insulating properties and (b) one or more additional layers to provide the desired mechanical strength and rigidity which allow simple and convenient installation as well as reliable and proper functional performance over a long service life.

While a number of adhesives, adhesive webs and binding fibers have been specifically developed over the years to secure the various layers of the laminates together, laminated shields and insulators have an inherent risk of delamination and failure. The potential is, in fact, significant mainly due to the harsh operating environment to which the shields and insulators are subjected. Many shields and insulators are located near and/or are designed to shield high heat sources such as the engine, transmission and exhaust system. As a result, the shields and insulators are often subjected to temperatures in excess of 200° F. which have a tendency to degrade the adhesives and binders over time.

Additionally, many shields and insulators are subjected to water from the surface of the roadways which has a tendency to be drawn by capillary action into the interface between the layers of the shields and the insulators. Such water may have a deleterious effect upon the integrity of the adhesive layer over time. This is particularly evident when one considers that water may also include in solution salt or other chemicals from the roadway which are corrosive and destructive.

A need is therefore identified for a trim panel insulator incorporating a nonlaminate acoustical and thermal insulating layer of polymer fibers suitable capable of providing the desired acoustical and thermal insulating properties. Advantageously, such an insulator also provides the desired mechanical strength and rigidity to allow simple and convenient installation while also providing a long service life characterized by reliable performance.

SUMMARY OF THE INVENTION

Accordingly, it is primary object of the present invention to provide a trim panel insulator for a vehicle. That insulator comprises a single, nonlaminate acoustical and thermal insulating layer of polymer fiber selected from a group consisting of polyester, a combination of polyester and fiberglass, polypropylene and any mixtures thereof.

In accordance with one aspect of the present invention the acoustic and thermal insulating layer may include a relatively high density, non-laminate skin of polymer fiber along at least one face thereof. Still further, the insulator may include a first facing layer over a first face of the acoustical and thermal insulating layer. Similarly, a second facing layer may be provided over a second face of the acoustical and thermal insulating layer. Either of the facing layers may be constructed from a material selected from a group consisting of polyester, polypropylene, polyethylene, rayon, ethylene vinyl acetate, polyvinyl chloride, fibrous scrim, metallic foil and mixtures thereof. The acoustical and thermal insulating layer has a weight per unit area of between about 20–130 g/ft$^2$.

In accordance with an additional aspect of the present invention, the acoustical and thermal insulating layer and the first facing and/or the second facing are approximately the same color. This provides a number of aesthetic benefits which will be described in greater detail below. Still, if desired, the facing and insulating layer may be contrasting colors such as black and white.

The benefits and advantages of the present invention will become readily apparent to those skilled in this art from the following description wherein there is shown and described several preferred embodiments of this invention, simply by way of illustration of some of the modes best suited to carry out the invention. As it will be realized, the invention is capable of still other different embodiments and its several details are capable of modification in various, obvious aspects all without departing from the invention. Accordingly, the drawing and descriptions will be regarded as illustrative in nature and not as restrictive.

BRIEF DESCRIPTION OF THE DRAWING

The accompanying drawing incorporated in and forming a part of the specification, illustrates several aspects of the present invention, and together with the description serves to explain the principles of the invention. In the drawing.

Reference will now be made in detail to the present preferred embodiment of the invention, an example of which is illustrated in the accompanying drawing.

DETAILED DESCRIPTION OF THE INVENTION

Figure 1:
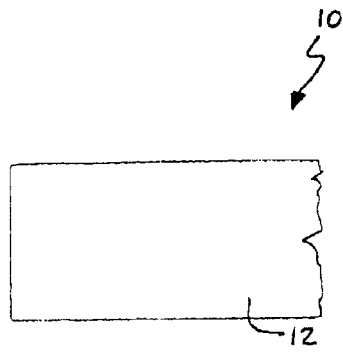
FIG. 1 is a schematical side elevational view of one possible embodiment of the present invention.

Reference is now made to FIG. 1 showing a first embodiment of the trim panel insulator 10 of the present invention. The insulator 10 comprises an acoustical and thermal insulating layer 12 of polymer fiber. More specifically, a single, nonlaminated layer 12 is provided with the necessary mechanical strength and rigidity to allow easy installation and the desired acoustical and thermal insulating properties.

Advantageously, all of these benefits are achieved in a light weight insulator 10 which may even be used in compact vehicles where fuel economy concerns lead manufacturers to seek weight savings wherever possible. The trim panel insulator 10 may, for example, be used as a pillar, door, quarter panel, trunk, roof, wheel house and floor pan liner.

The polymer fiber is not foamed and typically is a nonwoven fabric. The polymer fiber may be selected from a group of fibers consisting of polyester, a combination of polyester and fiberglass, polypropylene and any mixtures thereof. Advantageously, such an insulator 10 has a weight per unit area of between about 20–130 g/ft$^2$. For example, the acoustical and thermal insulating layer 12 may comprise substantially 100% polyethylene terephthalate.

An insulator 10 made from 100% polyethylene terephthalate provides a number of advantages. The insulator 10 of the present invention may be cut with a heat knife to give an edge. The insulator 10 can be premolded to accommodate different shapes and sizes and will conform to the size of the installation cavity even when the cavity is uneven.

Further, the insulator 10 of the present invention is dimensionally stable for many applications upon exposure to temperatures up to 450° F. The insulator 10 of the present invention may be free of glass fiber, which may reduce the irritation felt by some installers of the insulator 10.

Figure 2:
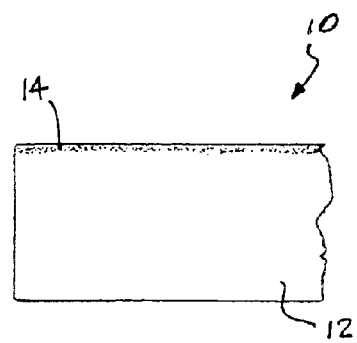
FIGS. 2–4 are schematical side elevational illustrations of other possible alternative embodiments of the present invention.

In a first alternative embodiment shown in FIG. 2, the insulator 10 also comprises a nonlaminate acoustical and thermal insulating layer 12 of polymer fiber (e.g. a nonwoven fabric) selected from a group consisting of polyester, a combination of polyester and fiberglass, polypropylene and any mixtures thereof. The layer 12 also includes a relatively high density, nonlaminate or unitary skin 14 of that polymer fiber along at least one face thereof. The formation of the relatively high density, nonlaminate skin 14 of polymer fiber may be completed in accordance with the process described in detail in co-pending U.S. patent application Ser. No. 09/607,478, entitled "Process For Forming A Multi-Layer, Multi-Density Composite Insulator", filed Jun. 30, 2000. The full disclosure of this document is incorporated herein by reference.

As set forth in that document, the layer 12 is fed or placed into a molding press including at least two molding elements such as platens. One of the molding elements is heated to a temperature above the softening temperature characteristic of the polymer based blanket material in the layer 12. The other molding element is heated to a temperature below the softening temperature characteristic of the polymer based blanket material in the layer 12. The molding elements are closed and differential heat and pressure are applied to two opposing sides of the layer 12. The applied pressure and resulting compression of the layer 12 varies depending upon the shape of the molding elements, the gap width between the molding elements and the thickness of the layer 12 at any given point.

This technique functions to heat a first zone of the layer 12 so as to soften the polyester binding fibers adjacent the first relatively hot molding element. In contrast, the remaining polymer binding fibers in the layer 12 remain relatively cool and are not softened. When this occurs in the mold with the layer 12 under compression, the fibers in the first zone are reshaped into a higher density skin 14. The other fibers in the layer 12 are not softened and, therefore, when the pressure is removed, they generally retain their original thickness and density characteristics. In this way, a single layer 12 of polymer based blanket material may be provided with a nonlaminate high-density skin 14 that is not prone or subject to delamination.

Of course, a high-density nonlaminate skin 14 may be provided along both faces of the layer 12 by running both molding elements at a temperature above the softening temperature characteristic of the polymer based blanket material in the layer 12.

Advantageously, the high density skin 14 will not delaminate from the layer 12 under the environmental conditions to which the vehicle and the insulator are subjected. The high density skin 14 also adds structural integrity and strength to the insulator 10 which aids significantly in handling and fitting the part during installation. The high density skin 14 is also more aesthetically pleasing. Still further, for many applications the high density skin 14 eliminates the need to provide an additional facing layer of another type of material such as a scrim. This serves to eliminate any potential failure of the insulator 10 due to delamination. It also results in an insulator 10 made exclusively from a single material that is, therefore, readily recyclable. Further, since the skin 14 may be formed with a hot platen during the molding of the insulator 10 to its desired shape, no additional processing step is required. This reduces production cost relative to an insulator with a facing since such a facing must be adhered to the acoustical and thermal insulating layer 12 in a separate processing step.

Figure 3:
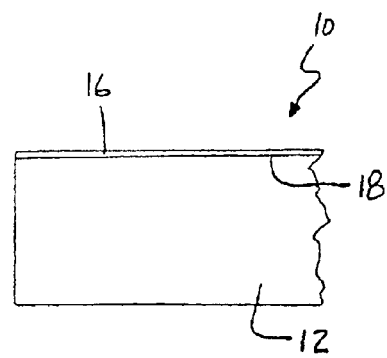

In yet another embodiment shown in FIG. 3, the insulator 10 includes a nonlaminate acoustical and thermal insulating layer of polymer fiber 12 (e.g. a nonwoven fabric) selected from a group consisting of polyester, a combination of polyester and fiberglass, polypropylene and any mixtures thereof in combination with a facing layer 16 over a first face 18 of the acoustical and thermal insulating layer. The facing may be present in one or more layers. Facing materials commonly employed include polyester, rayon, polyethylene, polypropylene, ethylene vinyl acetate, polyvinyl chloride, fibrous scrim, metallic foil and mixtures thereof. For example, a facing of ethylene vinyl acetate or polyvinyl chloride may have a weight per unit area of about 0.2–2.0 lbs/ft$^2$.

Figure 4:
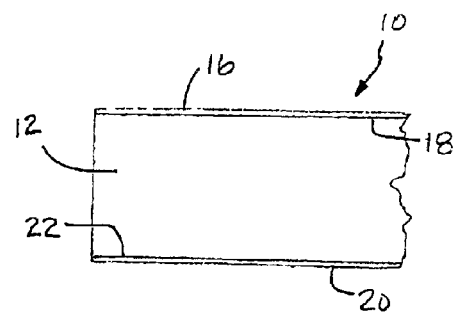

In yet another alternative embodiment shown in FIG. 4, the shield or insulator 10 comprises a nonlaminate acoustical and thermal insulating layer 12 of polymer fiber or a combination of polymer fiber and fiberglass as described above in combination with a first facing layer 16 covering a first face 18 thereof and a second facing layer 20 covering a second, opposite face 22 thereof. The second facing layer 20 may be constructed from the same or a different material as the first facing layer 16. The first and second facing layers 16, 20 may be attached to the layer 12 by means of an appropriate adhesive, adhesive web or a heat activated binder fiber in accordance with practices well known to those skilled in the art.

In accordance with another aspect of the present invention, the acoustical and thermal insulating layer 12 may include any appropriate form of coloring or pigment in order to provide a desired color that substantially approximates the color of the first and/or the second facing layers 16, 20. In fact, the layer 12 and the facings 16, 20 may be colored to substantially match the paint color of the vehicle if desired. This provides significant aesthetic benefits. Specifically, when the insulator 10 is molded under heat and pressure in order to nest within a cavity in the vehicle, the insulator is often subjected to deep drawing at one or more points. This deep drawing has a tendency to spread the weave of a fabric facing 16, 20 therby exposing a portion of the underlying face 18, 22 to light. If the acoustical and thermal insulating layer 12 does not substantially match the color of the facing layer 16, 20 this creates an undesirable color variation in these deep draw areas. In contrast, by matching the color of the layer 12 with the facing layers 16, 20, this color variation may be substantially eliminated.

It should further be appreciated that during use the facing layer 16, 20 may become snagged or subjected to a partial tear exposing some of the face of the underlying acoustical and thermal insulating layer 12. Once again, by matching the color of the layer 12 with the facing layers 16, 20, any color variation is substantially eliminated and one's attention is not as readily drawn to the damaged area. Accordingly, an overall improved aesthetic appearance is maintained over the service life of the insulator 10.

Figure 5:
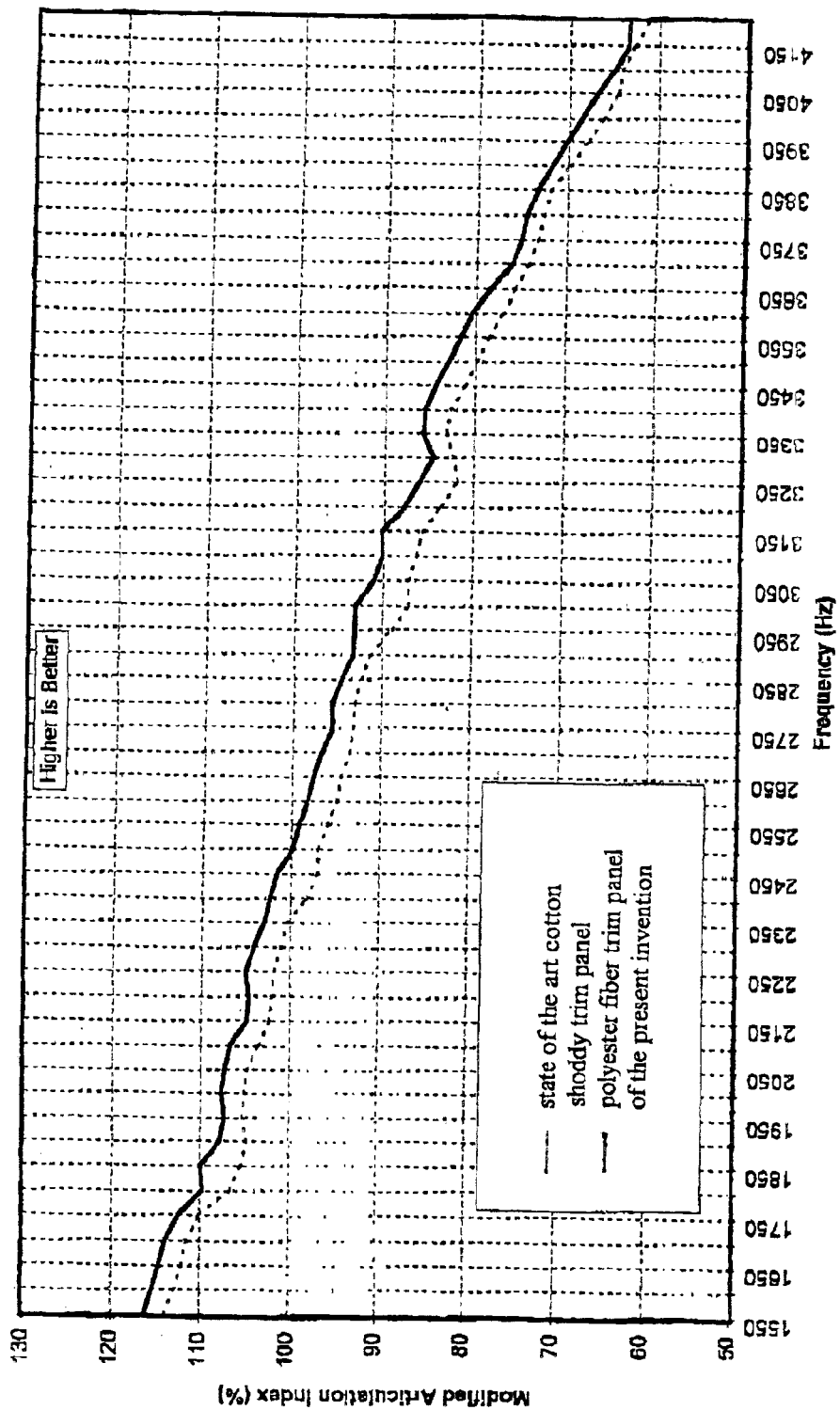
FIG. 5 is a graphical illustration of a 1500–4500 RPM first gear runup into a driver's right ear microphone comparing the acoustical performance of a standard state of the art trim panel and a trim panel constructed in accordance with the embodiment of the present invention shown in FIG. 1.

FIG. 5 graphically illustrates the acoustical performance of a standard state of the art trim panel and a trim panel constructed in accordance with the teachings of the present invention. Specifically, the modified articulation index for a frequency range of 1550–4200 Hertz is shown for a 1500–4500 RPM first gear runup into a driver's right ear microphone. The state of the art trim panel was constructed from cotton shoddy of different densities for different areas of the vehicle ranging from approximately 2.5–4.5 lbs/cubic foot. The trim panel of the present invention was a polyester fiber that averaged about 30% less density for any given area where the shoddy was replaced or from about 1.75–3.15 pcf. Thicknesses were from about 10–15 mm for the prior art cotton shoddy panel and 6–15 mm for the polyester fiber of the present trim panel. As should be appreciated from viewing FIG. 5, the trim panel of the present invention provided significantly improved acoustical performance throughout the tested frequency range.

In summary, numerous benefits result from employing the concepts of the present invention. A trim panel insulator 10 constructed in accordance with the teachings of the present invention provides a unique combination of mechanical strength and rigidity as well as thermal and acoustical properties which are consistently and reliably maintained over a long service life even when installed in the proximity of a high temperature heat source such as a catalytic converter. In one of the embodiments of the present invention, a relatively high density, nonlaminate skin 14 is provided which aids in handling, is aesthetically pleasing and maintains the full recycleability of the insulator.

The foregoing description of a preferred embodiment of the invention has been presented for purposes of illustration and description. It is not intended to be exhaustive or to limit the invention to the precise form disclosed. Obvious modifications or variations are possible in light of the above teachings. For example, the insulator 10 could include a relatively high density nonlaminate skin 14 on both opposing faces and/or along the edges of the insulator. Additionally, an insulator 10 with one or more high density, nonlaminate skins 14 could also include one or more facings 16, 20 if required to meet acoustical, thermal, structural and/or aesthetic performance requirements of a particular application.

The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed:

1. A trim panel insulator for a vehicle, consisting essentially of: a single, multidensity nonlaminate acoustical and thermal insulating layer of polymer fiber selected from a group consisting of polyester, a combination of polyester and fiberglass, polypropylene and any mixture thereof wherein said acoustical and thermal insulating layer includes a first facing layer defined as a processed first surface of said acoustical and thermal insulating layer, said first facing layer being formed by applying heat to a first surface of said acoustical and thermal insulating layer during the molding of said acoustical and thermal insulating layer.

2. The insulator of claim 1, including a second facing layer defined as a processed second surface of said acoustical and thermal insulating layer, said second facing layer being formed by applying heat to a second surface of said acoustical and thermal insulating layer during the molding of said acoustical and thermal insulating layer.

3. The insulator of claim 2, wherein said acoustical and thermal insulating layer has a weight per unit area of between about 20–130 g/ft$^2$.

4. The insulator of claim 3, wherein said acoustical and thermal insulating layer and said first facing layer are approximately the same color.

5. The insulator of claim 3, wherein said acoustical and thermal insulating layer, said first facing layer and said second facing layer are approximately the same color.

6. A trim panel insulator for a vehicle, consisting essentially of: a single, nonlaminate acoustical and thermal insulating layer of polymer fiber selected from a group consisting of polyester, a combination of polyester and fiberglass, polypropylene and any mixtures thereof also including a nonlaminate skin of polymer fiber along at least one face of said acoustical and thermal insulating layer, said nonlaminate skin having a higher density than a remaining portion of said insulating layer.

7. The insulator of claim 6, including a first insulating layer being constructed from the same material as said single nonlaminate acoustical and thermal insulating layer.

8. The insulator of claim 7, including a second facing layer over a second face of said acoustical and thermal insulating layer.

9. The insulator of claim 8, wherein said acoustical and thermal insulating layer has a weight per unit area of between about 20–130 g/ft$^2$.

10. The insulator of claim 9, wherein said acoustical and thermal insulating layer and said first facing layer are approximately the same color.

11. The insulator said of claim 9, wherein said acoustical and thermal insulating layer, said first facing layer and said second facing layer are approximately the same color.

12. The insulator of claim 1, wherein the insulating layer includes a facing layer having a density greater than a remaining portion of the insulating layer.

* * * * *